United States Patent [19]
Watanabe

[11] Patent Number: 5,910,786
[45] Date of Patent: Jun. 8, 1999

[54] ON-VEHICLE RADAR

[75] Inventor: Masahiro Watanabe, Tokyo, Japan

[73] Assignee: Mitsubishi Denki Kabushiki Kaisha, Tokyo, Japan

[21] Appl. No.: 09/005,015

[22] Filed: Jan. 9, 1998

[30] Foreign Application Priority Data

Oct. 2, 1997 [JP] Japan ................................ 9-269594

[51] Int. Cl.$^6$ .............................. G01S 13/60; G01S 13/93
[52] U.S. Cl. ............................... 342/70; 342/72; 342/73; 342/82
[58] Field of Search ................................ 342/70, 71, 72, 342/73, 82, 85, 84

[56] References Cited

U.S. PATENT DOCUMENTS

| | | | |
|---|---|---|---|
| 5,481,268 | 1/1996 | Higgins ..................................... | 342/70 |
| 5,517,196 | 5/1996 | Pakett et al. ............................... | 342/70 |
| 5,565,870 | 10/1996 | Fukuhura et al. ......................... | 342/70 |
| 5,751,240 | 5/1998 | Fujita et al. ............................... | 342/70 |
| 5,815,112 | 9/1998 | Sasaki et al. .............................. | 342/70 |

FOREIGN PATENT DOCUMENTS

| | | |
|---|---|---|
| 0816647 | 5/1996 | Japan . |
| 08189965 | 7/1996 | Japan . |
| 08211145 | 8/1996 | Japan . |

*Primary Examiner*—John B. Sotomayor
*Attorney, Agent, or Firm*—Sughrue, Mion, Zinn, Macpeak & Seas, PLLC

[57] ABSTRACT

When a transmitted and received radio wave is scanned, even if, for example, a large vehicle is running on an adjacent lane, a preceding vehicle running on the same lane as an own vehicle can be sensed and tracked continually. An on-vehicle radar comprises a transmitter receiver 6 for transmitting and receiving a radio wave with a relatively high frequency, and a signal processor 10 calculating a relative distance to an object and a relative velocity of the object on the basis of a radio wave transmitted by the transmitter receiver, reflected from the object, and received by the transmitter receiver. The transmitter receiver controls the power of a transmitted radio wave so that when a radio wave is to be transmitted in any transmission direction other than a specified transmission direction, the power of the transmitted radio wave will be made lower than that of a radio wave to be transmitted in the specified transmission direction, or even if the power of a received radio wave is larger than a given value, the power of the transmitted radio wave will not be decayed, and that when a radio wave is to be transmitted in the specified transmission direction, if the power of a received radio wave is larger than the given value, the power of the radio wave transmitted by the transmitter receiver will be decayed.

10 Claims, 5 Drawing Sheets

ON-VEHICLE RADAR

BACKGROUND OF THE INVENTION

1. Field of the Invention

The present invention relates to an on-vehicle radar mounted on a vehicle for detecting a preceding vehicle or the like.

2. Description of the Related Art

Figure 4:
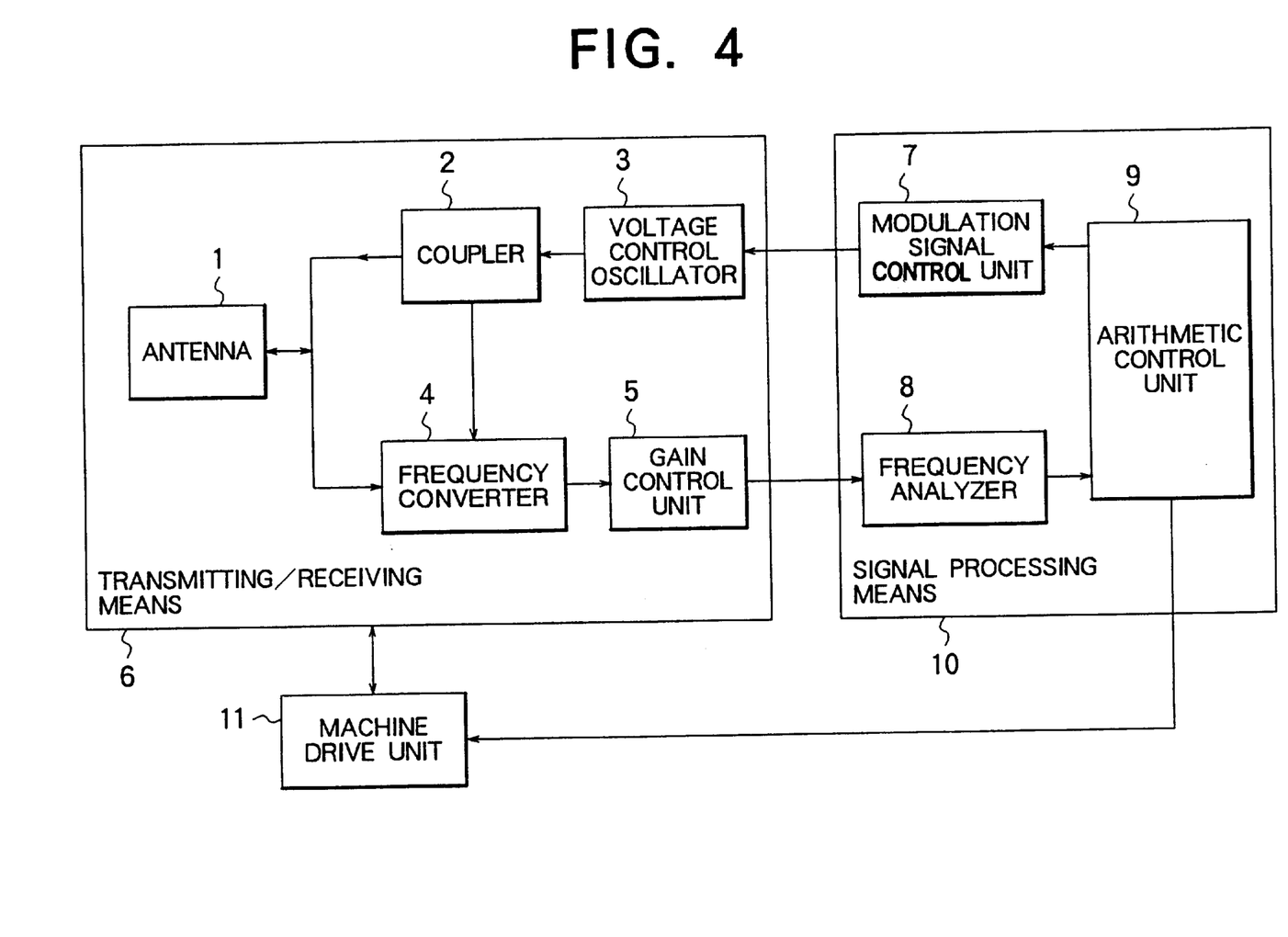
FIG. 4 is a block diagram showing a known on-vehicle radar.

A system shown in FIG. 4 is known as this kind of on-vehicle radar. In FIG. 4, the known on-vehicle radar comprises a transmitting/receiving means 6 including an antenna 1 for transmitting and receiving a radio wave, a coupler 2, a voltage control oscillator 3, a frequency converter 4, and a gain control unit 5, an arithmetic control unit 9 including a modulation signal control unit 7, a frequency analyzer 8, and a signal processor 10 for transferring signals to or from the transmitting/receiving means 6, and a transmission/reception direction control means in the form of a machine drive unit 11 for controlling the transmission and reception direction of a radio wave which is transmitted and received by the transmitting/receiving means 6 in response to a command issued from the arithmetic control unit 9. The machine drive unit 11 mechanically drives and controls the transmitting/receiving means 6 so as to change the transmission and reception direction in which the antenna 1 transmits and receives a radio wave in response to a command issued from the arithmetic control unit 9.

Next, the operation of the known on-vehicle radar having the above-mentioned components will be described. The modulation signal control unit 7 supplies a modulation signal instructing the voltage control oscillator 3 to generate a radio wave with a relatively high frequency which is linearly frequency-modulated. The radio wave with a relatively high frequency which is linearly frequency-modulated is radiated from the antenna 1 to the air via the coupler 2. A received wave emanating from an object that reflects a transmitted wave is caught through the antenna 1 and supplied to the frequency converter 4.

The frequency converter 4 mixes part of a transmitted radio wave sent from the coupler 2 with a received radio wave sent from the antenna 1, and generates a signal with a relatively low frequency. The frequency of a received radio wave has undergone a frequency shift dependent on a delay time of a radio wave proportional to a distance to an object. When an object is moving, the frequency of a received radio wave has undergone a Doppler shift dependent on the velocity of the moving object. The signal with a relatively low frequency sent from the frequency converter 4 is therefore a multivalued signal (video signal) containing information such as a relative distance to an object and a relative speed of the object. Every time the machine drive unit 11 scans a transmitted and received radio wave, the gain control unit 5 controls the power of the multivalued signal so that the power will be set to a proper level. The arithmetic control unit 9 calculates the relative distance and relative velocity using frequency data sent from the frequency analyzer 8.

Figure 5:
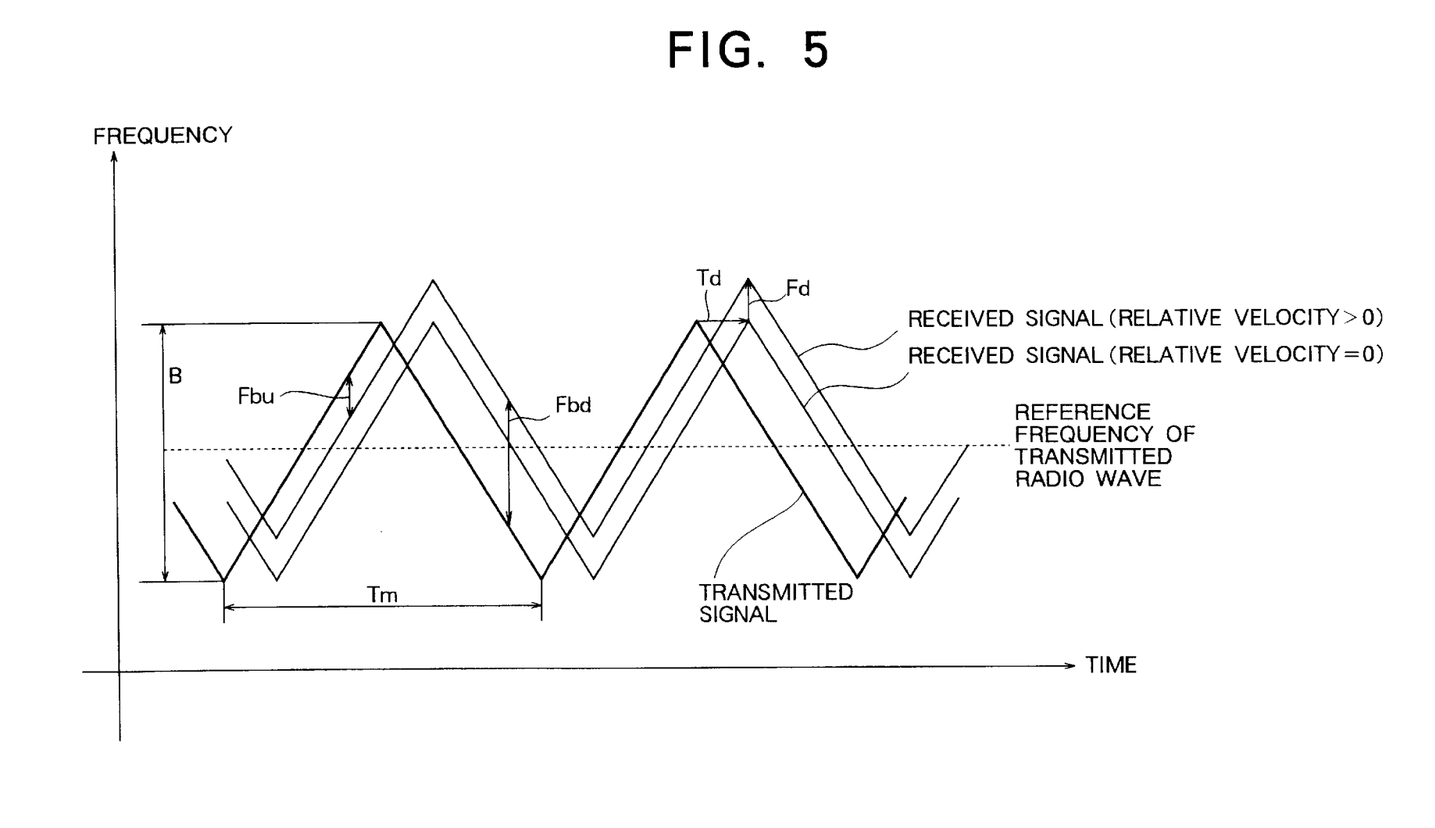
FIG. 5 is an explanatory diagram showing a method of calculating a relative distance and relative velocity of an on-vehicle radar.

Next, a method of calculating a relative distance and relative velocity will be described. FIG. 5 shows an example of calculating the relative distance and relative velocity using the on-vehicle radar. In FIG. 5, reference numerals have the following meanings:

C: light velocity=$3.0 \times 10^8$ m/sec $\lambda$: wavelength of a transmitted radio wave (for example, if the reference frequency F0 of a transmitted radio wave equals to 60 GHz, $\lambda$ indicates $5.0 \times 10^{-3}$ m)

B: frequency scanning bandwidth

Delay time in relation to a relative distance R: Td=2R/C

Doppler shift in relation to a relative velocity V: Fd=$2V/\lambda$

Fbu: frequency difference between a transmitted signal and a received signal occurring when the frequency of the transmitted signal is raised Fbd: frequency difference between a transmitted signal and a received signal occurring when the frequency of the transmitted signal is lowered When an object reflecting a radio wave exhibits no relative velocity, since the frequency differences Fbu and Fbd have the relationship of:

$$Fbu=Fbd=(B/(Tm/2)) \times (2R/C)=4 \times B \times R/Tm \times C$$

the relative distance to the object is expressed as follows:

$$R=(Tm \times C/4 \times B) \times Fbu \ (=Fbd) \quad (1)$$

Moreover, when an object reflecting a radio wave exhibits a relative velocity, since the frequency differences Fbu and Fbd are given by:

$$Fbu=(B/(Tm/2)) \times (2R/C)-2V/\lambda=4 \times B \times R/Tm \times C-2V/\lambda$$

$$Fbd=(B/(Tm/2)) \times (2R/c)+2V/\lambda=4 \times B \times R/Tm \times C+2V/\lambda$$

the relative distance to the object and the relative velocity of the object are expressed as follows:

$$R=(Tm \times C/8 \times B) \times (Fbu+Fbd) \quad (2)$$

$$V=(\lambda/4) \times (Fbd-Fbu) \quad (3)$$

Moreover, assuming that the resolution of a frequency $\Delta F$ (=1/(Tm/2)) is equal to $4 \times B \times R/Tm \times C$ or $2V/\lambda$, that is, $$\Delta F(=1/(Tm/2))=4 \times B \times \lambda R/Tm \times C$$

the resolution of the relative distance, $\Delta R$, is expressed as follows:

$$\Delta R=C/(2 \times B) \quad (4)$$

Since the resolution of a frequency, $\Delta F$, is expressed using the equation (4) as follows:

$$\Delta F(=1/(Tm/2))=2\Delta V/\lambda$$

the resolution of the relative velocity, $\Delta V$, is given by the following equation:

$$\Delta V=\lambda/Tm \quad (5)$$

For example, when $$B=C/(2 \times \Delta R)=3.0 \times 10^8/(2 \times 0.5)=3.0 \times 10^8$$

if $\Delta R$ should equal to 0.5 m, B is 300 MHz. Moreover, when $$Tm=\lambda/\Delta V=5.0 \times 10^{-3}/(1/3.6)=18 \times 10^{-3}$$

if $\Delta V$ should equal to 1 km/h, Tm is 18 msec.

The aforesaid known on-vehicle radar is adapted to, for example, an inter-vehicle distance alarm system for informing a driver of danger by sounding an alarm when an inter-vehicle distance relative to a preceding vehicle falls below a safe inter-vehicle distance and the risk of a collision gets higher, or to an inter-vehicle distance control system for tracking a preceding vehicle with a safe inter-vehicle distance retained.

Some released literatures describe a technique for improving the resolution of a distance by changing a modulation cycle or a technique for simplifying pairing needed for identifying the same target. That is to say, Japanese Unexamined Patent Publication No. 8-136647 (Honda Motor Co., Ltd.) has disclosed a technique for improving the resolution of a distance by shortening a modulation cycle (time) so as to decrease a normalized value of a quotient of a distance by a beat frequency. Japanese Unexamined Patent Publication No. 8-189965 (Honda Motor Co., Ltd.) has disclosed a technique for improving the resolution of a distance, wherein when a target is running at a high speed, a modulation cycle (time) is extended in order to widen a range of sensed distances; and when a target is running at a short distance, the modulation cycle (time) is shortened in order to confine the range of sensed distances to short distances. Japanese Unexamined Patent Publication No. 8-211145 (Toyota Motor Co.) has disclosed a technique for simplifying pairing needed for identifying the same target by selecting signals with the same amplitude, wherein when a modulation cycle (time) is shortened, the resolution of a velocity decreases, but a difference in amplitude of a signal reflected from a target from an original signal frequency-modulated to rise or fall gets smaller.

In general, in an on-vehicle radar, a radar equation below is established. The maximum sensed distance of the radar is proportional to the sensitivity or minimum required input of the radar (¼ squared).

$$R0^4 = R^4 \times 10^{(0,2)\alpha,R} = \{Pt \times Gt \times Gr \times \lambda^2 \times \sigma\} / \{(4\pi)^3 \times Smin \times (S/N) \times LSYS \times LAGC\} \quad (6)$$

where R0 is an ideal maximum sensed distance with no consideration taken into an atmospheric damping factor, R is an actual maximum sensed distance, α is an atmospheric damping factor, Pt is a transmitted power level, Gt is an antenna gain for transmission, Gr is an antenna gain for reception, λ is the wavelength of a transmitted radio wave, σ is an effective area of an object capable of reflecting a radio wave, Smin is the sensitivity or minimum required input of the radar, S/N is a sensing coefficient, LSYS is a loss occurring in the radar system, and LAGC is a decay to be applied by the gain control unit. When an antenna used in common for transmission and reception is employed, Gt equals to Gr.

In the aforesaid on-vehicle radar, generally, when a sensed distance ranges from 3 m to 160 m, a change in power of a radio wave received by the on-vehicle radar (dynamic range) is expressed as the following equation (7):

$$40 \log (160 \, m/3 \, m) \approx 69 \, dB \quad (7)$$

However, since the aforesaid on-vehicle radar is used while mounted on a vehicle, the environment is noisy. Under the circumstances, an A/D converter (analog signal-to-digital signal converter) employed in the arithmetic control unit 9 of the on-vehicle radar must produce a signal exhibiting a specified signal-to-noise ratio. The produced signal is therefore 8 bits long or 12 bits long at most. Assuming that one of all the bits is assigned to a plus or minus sign and two bits thereof are used to monitor a noise level, a change in power (dynamic range) that can be indicated by the remaining bits is as mentioned below.

When the signal produced by the A/D converter is 8 bits long, the change in power that can be indicated is calculated as follows:

$$20 \log (2^{(8-3)}) \approx 30 \, dB \quad (8)$$

When the signal produced by the A/D converter is 12 bits long, the change in power that can be indicated is calculated as follows:

$$20 \log (2^{(12-3)}) \approx 54 \, dB \quad (9)$$

A change in power proportional to a range of distances sensed by the on-vehicle radar generally exceeds a change in power that can be handled by the A/D converter over the same time. This means that all objects existing in the range of sensed distances cannot be sensed.

A range of distances (RAD) within which the A/D converter can handle a change in power over the same time is calculated as described below.

When the signal produced by the A/D converter is 8 bits long, assuming that the maximum sensed distance is 160 m and 30 dB≈40 log(160/Rmin) is established, the minimum sensed distance (Rmin) is approximately 28 m. Consequently, $$RAD = 28 \, m \text{ to } 160 \, m \quad (10)$$

Assuming that the minimum sensed distance is 3 m and 30 dB≈40 log(Rmax/3) is established, the maximum sensed distance (Rmax) is approximately 17 m. Consequently, $$RAD = 3 \, m \text{ to } 17 \, m \quad (11)$$

When the signal produced by the A/D converter is 12 bits long, assuming that the maximum sensed distance is 160 m and 54 dB≈40 log(160/Rmin) is established, the minimum sensed distance (Rmin) is approximately 7 m. Consequently, $$RAD = 7 \, m \text{ to } 160 \, m \quad (12)$$

Assuming that the minimum sensed distance is 3 m and 54 dB≈40 log(Rmax/3) is established, the maximum sensed distance (Rmax) is approximately 67 m. Consequently, $$RAD = 3 \, m \text{ to } 67 \, m \quad (13)$$

In general, the gain control unit 5 applies a delay (LAGC) according to the magnitude of power of a received radio wave so that the A/D converter employed in the arithmetic control unit 9 will not be saturated. Thus, the sensitivity (Smin) or minimum required input is degraded apparently in order to shorten the maximum sensed distance (Rmax). An object is sensed in units of the range of distances (RAD) from the maximum sensed distance (Rmax) to the minimum sensed distance (Rmin) permitting the A/D converter to remain unsaturated.

For example, when an object running at a relatively short distance of 3 m on the same lane as an own vehicle is sensed, since the power of a received radio wave is high, every time the machine drive unit 11 scans one transmitted and received radio wave, the gain control unit 5 applies a decay (LAGC) to the received radio wave for the purpose of preventing the A/D converter from being saturated. Thus, the power of the received radio wave is set to a relatively low level. The arithmetic control unit 9 then calculates a relative distance and a relative velocity.

However, as a result, apparently, the sensitivity or minimum required input (Smin) is degraded and the noise level is raised. An object running at a relative long distance of 160 m cannot be sensed because the power of a received radio wave is so low as to become indistinguishable from the noise level.

When the radar is employed in an inter-vehicle distance alarm system or inter-vehicle distance control system, priority is given to sensing of a target running at a short distance on the same lane as an own vehicle. The above drawback poses therefore few serious problems. However, since roads are congested these days, there may be a vehicle running on an adjacent lane or a large object nearby. In this case, when a radio wave of a relatively high power level is received, every time the machine drive unit 11 scans a transmitted and received radio wave, if the gain control unit 5 responds immediately to the received radio wave and applies a decay (LAGC) to the radio wave, the sensitivity (Smin) or minimum required input is degraded apparently. This causes the noise level to rise. An object existent on the same lane as the own vehicle which has been sensed on the verge of the sensitivity or minimum required input will not be able to be sensed any longer.

Assuming that the on-vehicle radar is employed in an inter-vehicle distance alarm system or inter-vehicle distance control system, when an object existent on the same lane as an own vehicle is sensed, if there is a vehicle running on an adjacent lane or a large object in the vicinity of the own vehicle, the object running on the same lane will not be able to be sensed any longer. The aforesaid drawback poses a serious problem in practice.

SUMMARY OF THE INVENTION

The present invention attempts to solve the aforesaid various problems. An object of the present invention is to provide an on-vehicle radar capable of continually sensing and tracking a preceding vehicle running on the same lane as an own vehicle even when a transmitted and received radio wave must be scanned on a congested road, for example, on a road on which a large vehicle is running on an adjacent lane.

According to one aspect of the present invention, there is provided an on-vehicle radar comprising a transmitting/receiving means for transmitting and receiving a radio wave with a relatively high frequency, and a signal processing means for calculating a relative distance to an object and a relative velocity of the object on the basis of a radio wave reflected from the object and received by the transmitting/receiving means. The transmitting/receiving means controls the power of a transmitted radio wave so that when a radio wave is to be transmitted in any transmission direction other than a specified transmission direction, the power of the transmitted radio wave will be lower than that of a radio wave to be transmitted in the specified transmission direction.

Owing to the above configuration, a transmitted wave of a given power level can be transmitted in a desired direction that is a given transmission direction in order to thus ensure the optimal sensitivity or minimum required input. In any undesirable direction other than the given transmission direction, a transmitted wave of a relatively low power level can be radiated in order to apparent degrade the sensitivity or minimum required input. This makes it possible to leave an object existent in an undesirable direction not sensed. As a result, an object can be sensed in a relatively wide range of distances from a short distance to a long distance.

In a preferred form of the present invention, the transmitting/receiving means includes an antenna for transmitting and receiving a radio wave, a voltage control oscillator for generating a transmitted radio wave, a coupler for receiving the transmitted radio wave generated by the voltage control oscillator and supplying it to the antenna, a power control unit interposed between the coupler and antenna for controlling the power of a transmitted radio wave to be supplied from the coupler to the antenna so that the power of a radio wave to be transmitted from the antenna in any transmission direction other than a specified transmission direction will be lower than that of a radio wave to be transmitted in the specified transmission direction, a frequency converter for receiving a transmitted radio wave sent from the coupler and a received radio wave sent from the antenna, and producing a signal whose frequency is equal to or lower than a given frequency, and a gain control unit for receiving an output signal of the frequency converter and controlling the gain of the signal so that the power of the signal will be set to a proper level.

In another preferred form of the present invention, the signal processing means comprises a modulation signal control unit for supplying a modulation signal to the voltage control oscillator, a frequency analyzer for receiving a signal from the gain control unit and analyzing the frequency of the signal, and an arithmetic control unit for supplying a control signal to the modulation signal control unit, and calculating a relative distance to an object, which reflects a transmitted radio wave radiated from the antenna so as to emanate a received radio wave, and a relative velocity of the object on the basis of frequency information provided by the frequency analyzer.

According to another aspect of the present invention, there is provided an on-vehicle radar comprising a transmitting/receiving means for transmitting and receiving a radio wave with a relatively high frequency, and a signal processing means for calculating a relative distance to an object and a relative velocity of the object on the basis of a radio wave reflected from an object and received by the transmitting/receiving means. When a radio wave is to be transmitted in any transmission direction other than a specified transmission direction, even if the power of a received radio wave is larger than a given value, the transmitting/receiving means does not decay the power of the transmitted radio wave. When a radio wave is to be transmitted in the specified transmission direction, if the power of a received radio wave is larger than the given value, the power of the radio wave transmitted by the transmitting/receiving means is decayed.

Owing to the above configuration, even when the power of a received radio wave is relatively high, the power of a radio wave to be transmitted in any undesirable direction, that is, any transmission direction other than the specified transmission direction is not decayed. The power of only a radio wave to be transmitted in a desired direction, that is, the specified direction is decayed if necessary. Consequently, an object can be sensed in a relatively wide range of distances from a short distance to a long distance.

In a preferred form of the present invention, the transmitting/receiving means comprises an antenna for transmitting and receiving a radio wave, a voltage control oscillator for generating a transmitted wave, a coupler for receiving the transmitted radio wave generated by the voltage control oscillator and supplying it to the antenna, a frequency converter for receiving the transmitted radio wave sent from the coupler and a received radio wave sent from the antenna, and producing a signal whose frequency is equal to or lower than a given frequency, and a gain control unit for receiving an output signal from the frequency converter and controlling the gain of the signal so that the power thereof will be set to a proper level. The gain control unit gives control so that when a radio wave is received through the antenna in any reception direction other than a specified reception direction, even if the power of the received radio wave is relatively high, the gain of the radio wave will not be reduced.

In another preferred form of the present invention, the signal processing means comprises a modulation signal control unit for supplying a modulation signal to the voltage control oscillator, a frequency analyzer for receiving a signal from the gain control unit and analyzing the frequency of the signal, and an arithmetic control unit for supplying a control signal to the modulation signal control unit, calculating a relative distance to an object, which reflects a transmitted radio wave radiated from the antenna so as to emanate a received radio wave, and a relative velocity of the object, and transmitting a control signal to the gain control unit so that when a radio wave is to be transmitted from the antenna in any direction other than the specified transmission direction, even if the power of a received radio wave is relatively high, the gain control unit will not newly apply a decay, and that only when a radio wave is to be transmitted in the specified transmission direction, the gain control unit will apply a decay.

In yet another preferred form of the invention, the on-vehicle radar further comprises a specified direction setting means for detecting a lane on which an own vehicle having the on-vehicle radar mounted therein is running and outputting a signal indicating the result of the detection to the signal processing means. The specified transmission direction is the direction of the lane on which the own vehicle is running.

In still another preferred form of the present invention, the specified direction setting means comprises a steering sensor for detecting an angle of steering at which a vehicle having the on-vehicle radar mounted thereon is steered.

In still another preferred form of the present invention, the specified direction setting means comprises a camera for imaging a view in front of a vehicle having the on-vehicle radar mounted thereon.

In still another preferred form of the present invention, the on-vehicle radar further comprises a transmission/reception direction control means for controlling a scanning direction in which a transmitted and received radio wave sent from the transmitting/receiving means is scanned.

The above and other objects, features and advantages of the present invention will become readily apparent from the following detailed description of preferred embodiments of the invention taken in conjunction with the accompanying drawings.

DESCRIPTION OF THE PREFERRED EMBODIMENTS

Preferred embodiments of the present invention will be now described below while referring to the accompanying drawings.

First Embodiment

Figure 1:
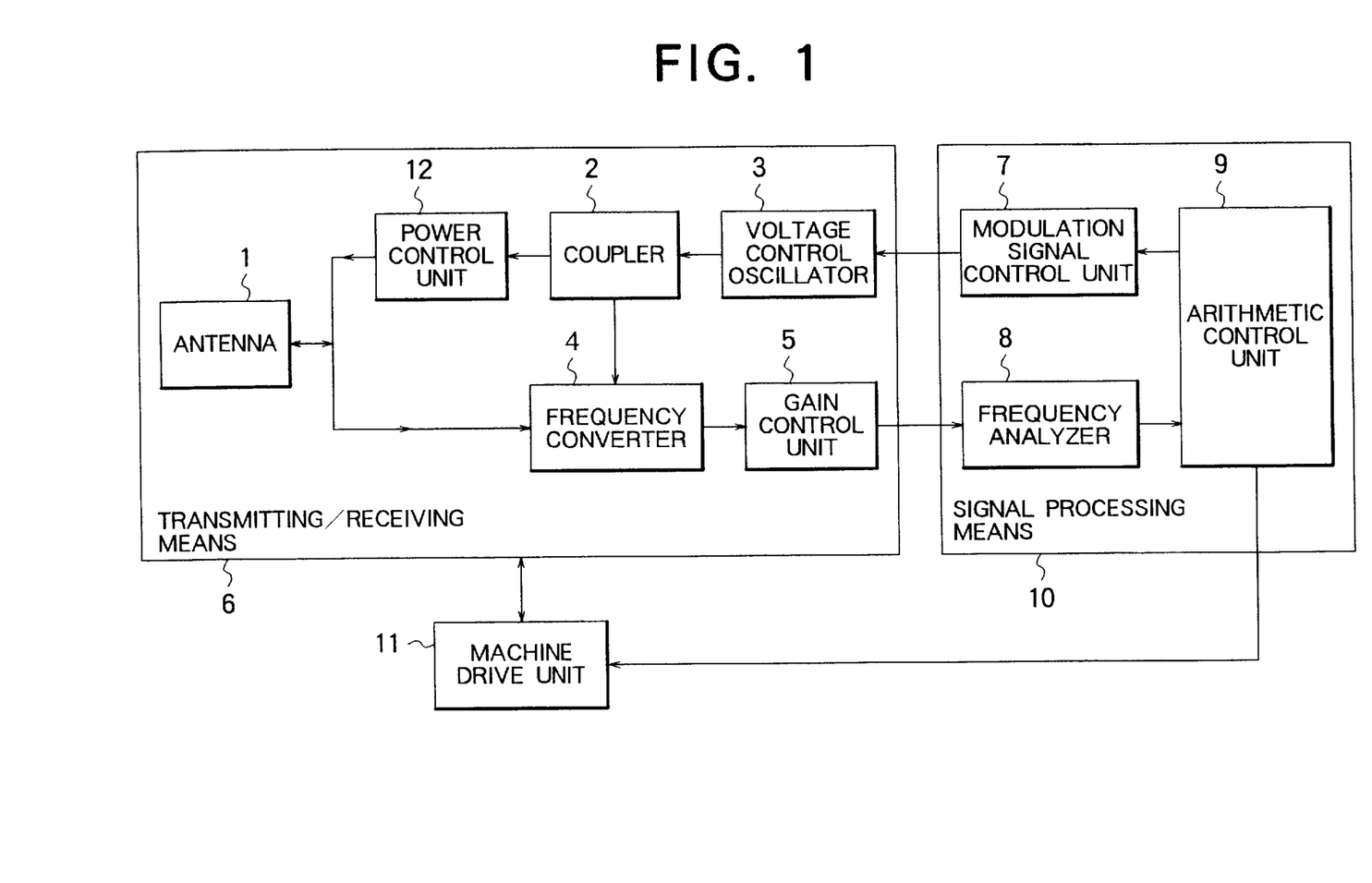
FIG. 1 is a block diagram showing the configuration of an on-vehicle radar in accordance with the first embodiment of the present invention.

FIG. 1 schematically shows the configuration of an on-vehicle radar in accordance with the first embodiment of the present invention. In FIG. 1, the illustrated on-vehicle radar comprises a transmitting/receiving means 6 including an antenna 1, a coupler 2, a voltage control oscillator 3, a frequency converter 4, a gain control unit 5, and a power control unit 12, a signal processing unit 10 including a modulation signal control unit 7, a frequency analyzer 8, an arithmetic control unit 9, and a transmission/reception direction control means in the form of a machine drive unit 11 for mechanically driving and controlling the transmitting/receiving means 6 and for controlling a transmission and reception direction, in which a radio wave produced by the transmitting/receiving means 6 is transmitted and received, in response to a command issued from the signal processing unit 10. In the first embodiment, the antenna 1, coupler 2, voltage control oscillator 3, frequency converter 4, gain control unit 5, modulation signal control unit 7, frequency analyzer 8, arithmetic control unit 9, and machine drive unit 11 are identical to those in the known radar shown in FIG. 4. The radar of the first embodiment is different from the known radar in that the transmitting/receiving means 6 includes the power control unit 12. A radio wave with a relatively high frequency which is linearly frequency-modulated is supplied from the voltage control oscillator 3 to the power control unit 12 via the coupler 2. When a transmitted and received radio wave is scanned, the power control unit 12 controls the power of a radio wave to be transmitted in an arbitrary direction so that the power will be set to a relatively low level, and then supplies the radio wave to the antenna 1.

Next, the operation of the on-vehicle radar of the first embodiment having the above components will be described. The modulation signal control unit 7 generates a modulation signal for instructing the voltage control oscillator 3 to generate a radio wave with a relatively high frequency which is linearly frequency-modulated, and supplies the modulation signal to the voltage control oscillator 3. The radio wave with a relatively high frequency which is linearly frequency-modulated and generated by the voltage control oscillator 3 is supplied to the power control unit 12 via the coupler 2. When a transmitted and received radio wave is scanned, the power control unit 12 controls the power of the supplied radio wave so that when the radio wave is to be transmitted in an arbitrary direction, the power of the radio wave will be set to a relatively low level. The resultant radio wave is then radiated from the antenna 1 to the air.

A received radio wave emanating from an object that reflects a transmitted radio wave is fetched through the antenna 1 and supplied to the frequency converter 4. The frequency converter 4 mixes part of the transmitted radio wave sent from the coupler 2 with the received radio wave sent from the antenna 1, and generates a signal with a relatively low frequency. The frequency of a received radio wave has undergone a frequency shift dependent on a delay time of the radio wave proportional to a distance to an object. When an object is moving, the frequency of a received radio wave has undergone a Doppler shift dependent on the velocity of the moving object. A signal with a relatively low frequency sent from the frequency converter 4 is therefore a multivalued signal containing information of a relative distance to an object and a relative velocity of the object (video signal). Every time the machine drive unit 11 scans one transmitted and received radio wave, the power of the multivalued signal is set to a proper level by the gain control unit 5. Using frequency data sent from the frequency analyzer 8, the arithmetic control unit 9 calculates a relative distance and relative velocity.

According to the aforesaid radar equation (6), when the power (Pt) of a transmitted radio wave to be radiated in an arbitrary direction is set to a relatively low level by the power control unit 12, the maximum sensed distance (R) in the arbitrary direction is shortened. This means that the sensitivity (Smin) or minimum required input gets apparently worse than that attained when the power (Pt) of a transmitted radio wave is normal. What is referred to as an arbitrary direction is a direction associated with a specified cycle of frequency modulation among a plurality of cycles of frequency modulation within one scan. The power of a radio wave received in an arbitrary direction is therefore relatively low. It will therefore not take place that the gain control unit 5 responds to the power of a received radio wave and applies a decay (LAGC), and that the sensitivity (Smin) or minimum required input is degraded apparently. Consequently, only when a radio wave is received in a desired direction, the gain control unit 5 applies a decay (LAGC). Thus, an object can be sensed in a relatively wide range of distances from a short distance to a long distance.

According to the first embodiment, every time the machine drive unit 11 scans one transmitted and received radio wave, only when an object is existent in a desired direction, the object can be sensed in a relatively wide range of distances from a short distance to a long distance. It can therefore be avoided that when a received radio wave is emanating from an object existent in an arbitrary direction, an object sensed in a desired direction will not be able to be sensed any longer.

Second Embodiment

Figure 2:
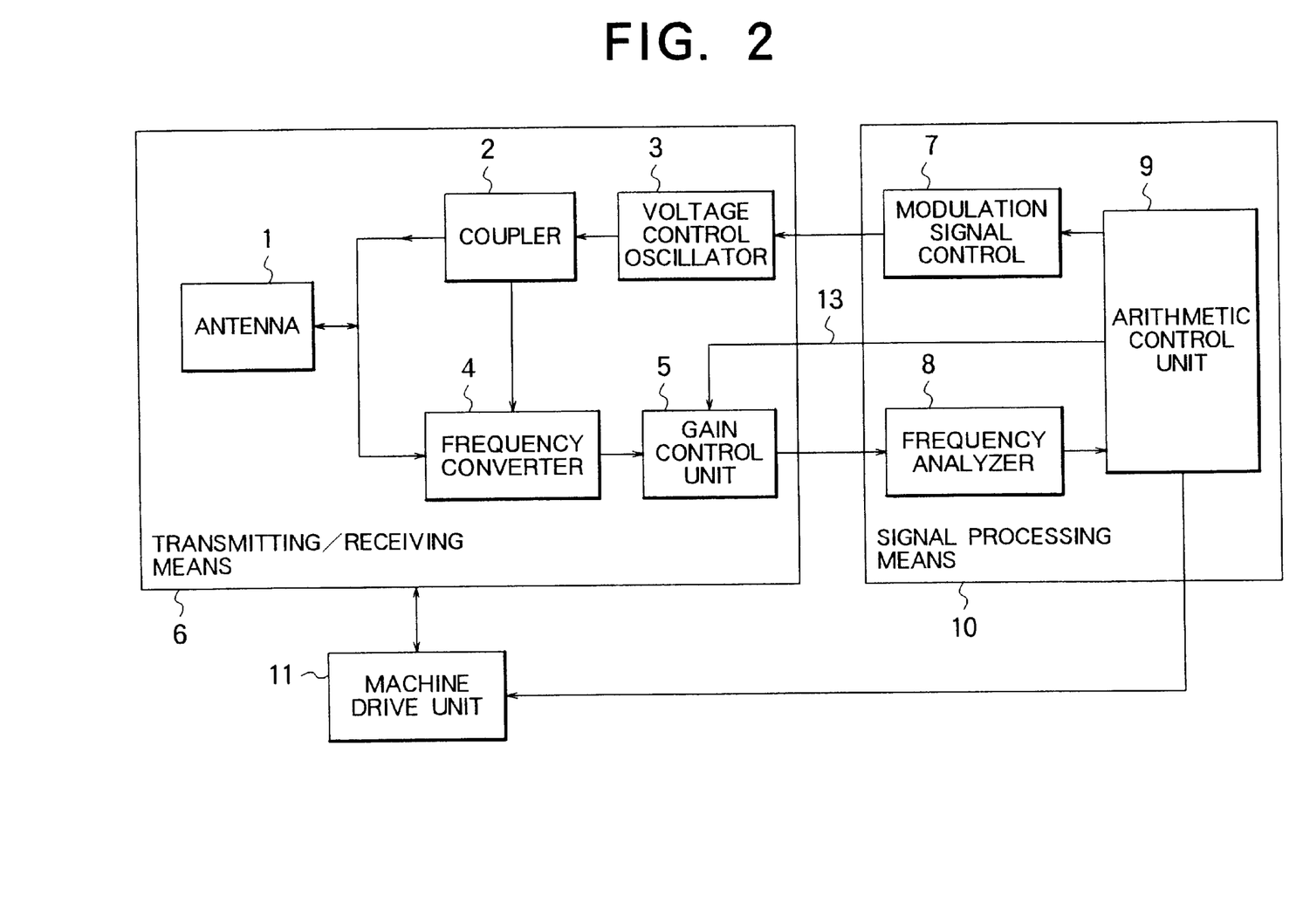
FIG. 2 is a block diagram showing the configuration of an on-vehicle radar in accordance with the second embodiment of the present invention.

FIG. 2 schematically shows the configuration of an on-vehicle radar in accordance with the second embodiment of the present invention. The configuration of the on-vehicle radar of the second embodiment is nearly identical to that of the known radar, but is different therefrom in that a control signal sent from the signal processing unit 9 is supplied to the gain control unit 5.

Next, the operations of the on-vehicle radar of the second embodiment having the above configuration will be described. The modulation signal control unit 7 supplies a modulation signal instructing the voltage control oscillator 3 to generate a radio wave with a relatively high frequency which is linearly frequency-modulated, and supplies the modulation signal to the voltage control oscillator 3. The radio wave with a relatively high frequency which is linearly frequency-modulated and supplied from the voltage control oscillator 3 is radiated from the antenna 1 to the air via the coupler 2. A received radio wave emanating from an object that reflects the transmitted wave is caught through the antenna 1 and supplied to the frequency converter 4. The frequency converter 4 mixes part of the transmitted radio wave sent from the coupler 2 with the received radio wave sent from the antenna 1, and generates a signal with a relatively low frequency. The frequency of a received radio wave has undergone a frequency shift dependent on a delay time of the radio wave proportional to a distance to an object. When an object is moving, the frequency of a received radio wave has undergone a Doppler shift dependent on the velocity of the moving object. The signal with a relatively low frequency sent from the frequency converter 4 is therefore a multivalued signal containing information such as a relative distance to an object and a relative velocity of the object (video signal). The power of the multivalued signal is controlled so that every time the machine drive unit 11 scans one transmitted and received radio wave, even when the power of a radio wave received in an arbitrary direction is high, the gain control unit 5 will not newly apply a decay. Only when a radio wave is received in a desired direction, the gain control unit 5 will apply a decay to the power of the radio wave. Based on frequency data sent from the frequency analyzer 8, the arithmetic control unit 9 calculates a relative distance and relative velocity.

According to the aforesaid radar equation (6), when a radio wave of a relatively high power level is received in an arbitrary direction, if the gain control unit 5 responds to the power and applies a decay (LAGC) to the power, the maximum sensed distance (R) in the arbitrary direction is shortened. This means that the sensitivity (Smin) or minimum required input gets apparently worse than that attained when a radio wave of a normal power level is received. What is referred to as an arbitrary direction is a direction associated with a specified cycle of frequency modulation among a plurality of cycles of frequency modulation with one scan.

However, in general, the response characteristic of a variable-gain amplifier employed in the gain control unit 5 is not good. It is therefore impossible for the gain control unit 5 to apply a decay (LAGC) during only a specified cycle of frequency modulation within one scan period. Moreover, in the case of a continuous-wave radar like the on-vehicle radar of this embodiment which transmits a continuous wave but does not transmit a pulsed wave, when the gain control unit 5 applies the decay (LAGC) during only the specified cycle of frequency modulation within one scan period, a mate signal to be paired with a signal frequency-modulated to rise or fall may not be found. Consequently, it may become impossible to calculate a relative distance and a relative velocity.

In general, when a radio wave of a relatively high power level is received in an arbitrary direction within one scan, the gain control unit 5 applies a decay (LAGC) of the same magnitude during all cycles of frequency modulation within the next one scan period. As a result, the maximum sensed distance (R) of the radar is shortened in any direction within the one scan period. The gain control unit 5 is therefore designed not to respond to a received radio wave of a relatively high power level emanating in an arbitrary direction and apply the decay (LAGC). Judging from the magnitude of a radio wave received in a desired direction alone, the gain control unit 5 applies the decay (LAGC). Within one scan period, the gain control unit 5 judges from the magnitude of a radio wave received in a desired direction alone whether or not to apply the decay (LAGC).

According to the second embodiment, every time the machine drive unit 11 scans one transmitted and received radio wave, only when an object is running in a desired direction, the object can be sensed in a relatively wide range of distances from a short distance to a long distance. Even when a received radio wave of a relatively high power level is emanating from an object existing in an arbitrary direction, the gain control unit 5 will not newly apply a decay. It will therefore not take place that a sensed object existing in a desired direction will not be able to be sensed any longer.

Third Embodiment

Figure 3:
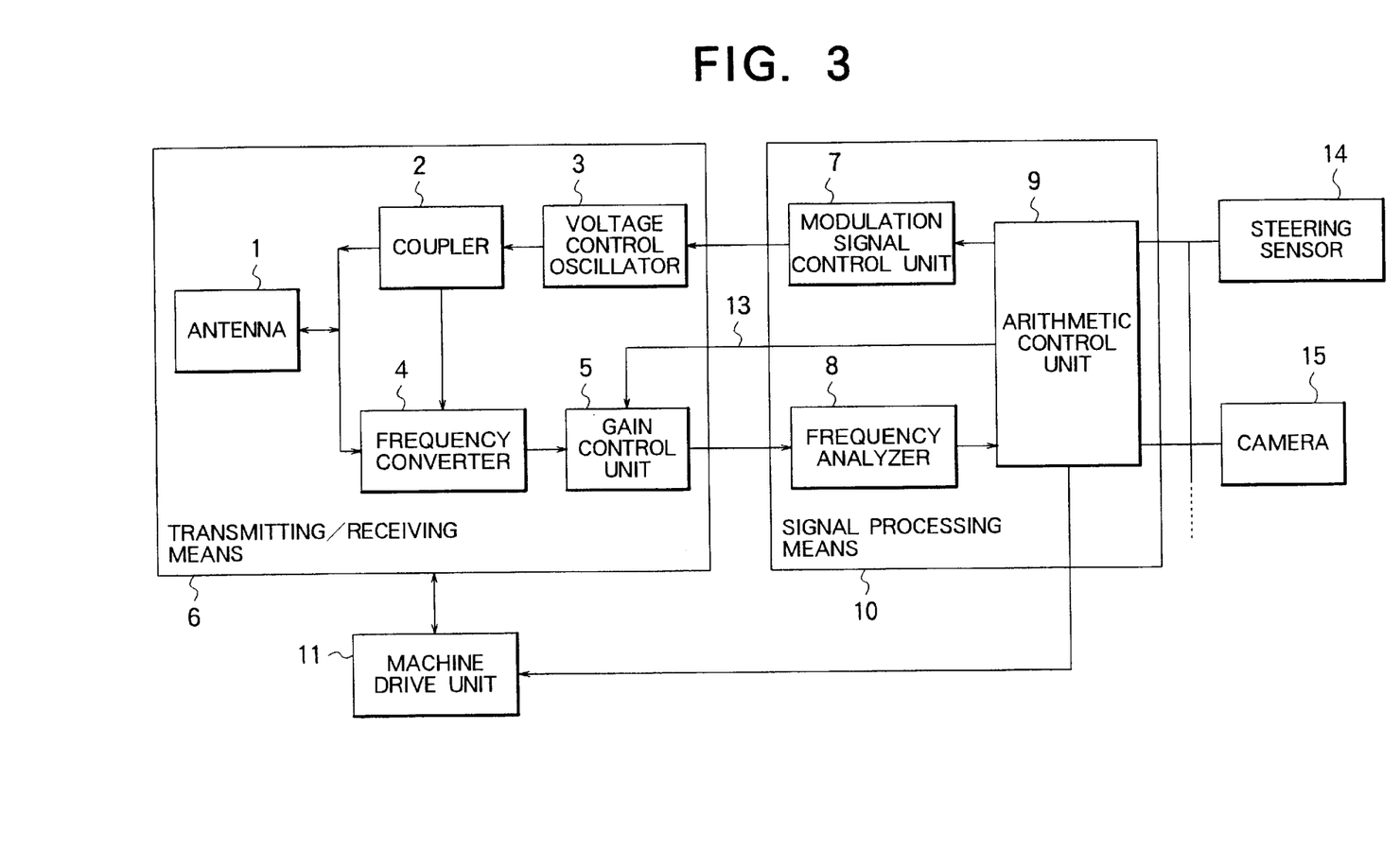
FIG. 3 is a block diagram showing the configuration of an on-vehicle radar in accordance with the third embodiment of the present invention.

FIG. 3 schematically shows the configuration of an on-vehicle radar in accordance with the third embodiment of the present invention. The configuration of the on-vehicle radar of the third embodiment is nearly identical to that of the on-vehicle radar of the second embodiment, but is different therefrom in that a steering sensor 14 and a camera 15 are further included. The operation of the on-vehicle radar of the third embodiment is nearly identical to that of the on-vehicle radar of the second embodiment. In the second embodiment, even when a radio wave of a relatively high power level is received in an arbitrary direction, the gain control unit 5 does not respond to the radio wave and apply a decay (LAGC). Only when a radio wave is received in a desired direction, the gain control unit 5 applies the decay (LAGC). By contrast, in the third embodiment, the arbitrary direction is set to any direction other than the direction of a lane on which an own vehicle is running which is detected by the steering sensor 14 or camera 15.

Specifically, in the third embodiment, output signals of the steering sensor 14 and camera 15 are input to the arithmetic control unit 9. The arithmetic control unit 9 determines the direction of a lane on which an own vehicle is running on the basis of at least one of the output signals, and supplies a signal representing the result of the determination to the gain control unit 5.

The gain control unit 5 controls the power of a signal output from the frequency converter 4 so that every time the machine drive unit 11 scans one transmitted and received radio wave, when a received radio wave emanates from an object existing in any direction other than the direction of a preceding vehicle running on the same lane as an own vehicle which is detected by the steering sensor 14 or camera 15, even if the received radio wave has a relatively high power level, the gain control unit 5 will not newly apply a decay. Only when a radio wave is received in the direction of the preceding vehicle running on the same lane as the own vehicle, the gain control unit 5 newly applies a decay to the power of the radio wave. Based on frequency data sent from the frequency analyzer 8, the arithmetic control unit 9 calculates a relative distance and a relative velocity.

When a received radio wave of a relatively high power level is emanating from an object existent in any direction other than the direction of a preceding vehicle running on the same lane as an own vehicle, if the gain control unit 5 responds to the received radio wave and applies a decay (LAGC), the maximum sensed distance (R) of the radar system would be shortened. Even when a received radio wave of a relatively high power level is emanating from an object in any direction other than the direction of the preceding vehicle running on the same lane as the own vehicle, the gain control unit 5 does not newly apply the decay (LAGC). Only when a received radio wave is emanating from an object in the direction of the preceding vehicle running on the same lane as the own vehicle, the gain control unit 5 judges whether or not to newly apply the decay (LAGC). Within one scan period, only when a received radio wave is emanating from an object in the direction of the lane on which the own vehicle is running, the gain control unit 5 judges whether or not to apply the decay (LAGC).

FIG. 3 includes both the steering sensor 14 and camera 15. In some cases, one of the steering sensor and camera may be included. Based on an output signal of the steering sensor or camera, the arithmetic control unit 9 may determine the direction of the lane on which the own vehicle is running.

According to the third embodiment, every time the machine drive unit 11 scans one transmitted and received radio wave, only when an object is existent in the direction of a preceding vehicle running on the same lane as an own vehicle, the object can be sensed in a relatively wide range of distances from a short distance to a long distance. When a received radio wave of a relatively high power level is emanating from an object existent in any direction other than the direction of the preceding vehicle running on the same lane as the own vehicle, the gain control unit 5 will not newly apply a decay. Thus, the preceding vehicle running on the same lane as the own vehicle can be sensed and tracked continually.

As described so far, according to an on-vehicle radar of the present invention, only when a radio wave is transmitted and received in a desired direction depending upon a running situation, an object can be sensed in a relatively wide range of distances from a short distance to a long distance. Even if a relatively large vehicle is running on an adjacent lane, a vehicle running in the desired direction can be sensed and tracked continually.

What is claimed is:

1. An on-vehicle radar, comprising:

a transmitting/receiving means for transmitting and receiving a radio wave with a relatively high frequency; and a signal processing means for calculating a relative distance to an object and a relative velocity of the object on the basis of a radio wave which is transmitted by said transmitting/receiving means, reflected from the object, and received by said transmitting/receiving means, wherein said transmitting/receiving means controls the power of a transmitted radio wave so that the power of a radio wave to be transmitted in any transmission direction other than a specified transmission direction will be lower than that of a radio wave to be transmitted in the specified transmission direction.

2. An on-vehicle radar according to claim 1, wherein said transmitting/receiving means comprises:

an antenna for transmitting and receiving a radio wave;

a voltage control oscillator for generating a transmitted radio wave;

a coupler for receiving the transmitted radio wave generated by said voltage control oscillator and supplying it to said antenna;

a power control unit interposed between said coupler and said antenna for controlling the power of a transmitted radio wave to be supplied from said coupler to said antenna so that the power of a radio wave to be transmitted from said antenna in any transmission direction other than the specified transmission direction will be lower than the power of a radio wave to be transmitted in the specified transmission direction;

a frequency converter for receiving the transmitted radio wave sent from said coupler and the received radio wave sent from the antenna, and producing a signal whose frequency is equal to or lower than a given frequency; and a gain control unit for receiving an output signal of said frequency converter and controlling the gain of the signal so that the power of the signal will be set to a proper level.

3. An on-vehicle radar according to claim 2, wherein said signal processing means includes:

a modulation signal control unit for supplying a modulation signal to said voltage control oscillator;

a frequency analyzer for receiving the signal sent from said gain control unit and analyzing the frequency of the signal; and an arithmetic control unit for supplying a control signal to said modulation signal control unit, and calculating a relative distance to an object, which reflects a radio wave transmitted from said antenna so as to emanate a received radio wave, and a relative velocity of the object on the basis of frequency information provided by said frequency analyzer.

4. An on-vehicle radar, comprising:

a transmitting/receiving means for transmitting and receiving a radio wave with a relatively high frequency; and a signal processing means for calculating a relative distance to an object and a relative velocity of the object on the basis of a radio wave which is transmitted by said transmitting/receiving means, reflected from the object, and received by said transmitting/receiving means, wherein said transmitting/receiving means controls the power of a transmitted radio wave so that when a radio wave is to be transmitted in any transmission direction other than a specified transmission direction, even if the power of a received radio wave is larger than a given value, the power of the transmitted radio wave will not be decayed, and that when a radio wave is to be transmitted in the specified transmission direction, if the power of a received radio wave is larger than the given value, the power of the radio wave to be transmitted by the transmitting/receiving means will be decayed.

5. An on-vehicle radar according to claim 4, wherein said transmitting/receiving means comprises:

an antenna for transmitting and receiving a radio wave;

a voltage control oscillator for generating a transmitted radio wave;

a coupler for receiving the transmitted radio wave generated by said voltage control oscillator and supplying it to said antenna;

a frequency converter for receiving the transmitted radio wave sent from said coupler and a received radio wave sent from said antenna, and producing a signal whose frequency is equal to or lower than a given frequency; and a gain control unit for receiving the output signal sent from said frequency converter and controlling the gain of the signal so that the power of the signal will be set to a proper level, wherein said gain control unit gives control so that when a radio wave is received by said antenna in any reception direction other than a specified reception direction, even if the power of the received radio wave is relatively high, the gain of the received radio wave will not be reduced.

6. An on-vehicle radar according to claim 5, wherein said signal processing means comprises:

a modulation signal control unit for supplying a modulation signal to said voltage control oscillator;

a frequency analyzer for receiving a signal sent from said gain control unit and analyzing the frequency of the signal; and an arithmetic control unit for supplying a control signal to said modulation signal control unit, calculating a relative distance to an object, which reflects a radio wave transmitted from said antenna so as to generate a received radio wave, and a relative velocity of the object on the basis of frequency information provided by said frequency analyzer, and sending a control signal to said gain control unit so that when a radio wave is to be transmitted from said antenna in any direction other than the specified transmission direction, even if the power of a received radio wave is relatively high, the gain control unit will not newly apply a decay, and that only when a radio wave is to be transmitted in the specified transmission direction, the gain control unit will judge whether or not to apply a decay.

7. An on-vehicle radar according to claim 4, further comprising a specified direction setting means for detecting a lane on which an own vehicle having said on-vehicle radar mounted therein is running, and outputting a signal indicating the result of the detection to said signal processing means, wherein the specified transmission direction is the direction of the lane on which the own vehicle is running.

8. An on-vehicle radar according to claim 7, wherein said specified direction setting means comprises a steering sensor for detecting an angle of steering at which said vehicle having said on-vehicle radar mounted thereon is steered.

9. An on-vehicle radar according to claim 7, wherein said specified direction setting means comprises a camera for imaging a view in front of the vehicle having said on-vehicle radar mounted thereon.

10. An on-vehicle radar according to claim 4, further comprising a transmission/reception direction control means for controlling a scanning direction in which a transmitted and received radio wave sent from said transmitting/receiving means is scanned.

* * * * *